(12) United States Patent
Wu

(10) Patent No.: US 6,909,072 B2
(45) Date of Patent: Jun. 21, 2005

(54) CONSTANT TEMPERATURE SEALED COOKING DEVICE

(76) Inventor: Chia-Hsiung Wu, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 10/759,042

(22) Filed: Jan. 20, 2004

(65) Prior Publication Data

US 2004/0149717 A1 Aug. 5, 2004

(30) Foreign Application Priority Data

Jan. 30, 2003 (TW) .................................. 92201841 U

(51) Int. Cl.[7] .............................................. A47J 27/00
(52) U.S. Cl. ..................... 219/433; 219/430; 219/432; 219/436
(58) Field of Search ................... 219/384, 429, 219/430–436, 438–442, 530, 536, 540, 542, 544, 548, 552

(56) References Cited

U.S. PATENT DOCUMENTS

| | | | | |
|---|---|---|---|---|
| 3,584,196 A | * | 6/1971 | Kurokawa et al. | 219/435 |
| 3,876,861 A | * | 4/1975 | Wightman et al. | 219/433 |
| 3,885,129 A | * | 5/1975 | Fabricius | 219/433 |
| 4,234,783 A | * | 11/1980 | Aoshima | 219/432 |
| 4,284,880 A | * | 8/1981 | Keiser | 219/432 |
| 4,307,287 A | * | 12/1981 | Weiss | 219/433 |
| 4,341,949 A | * | 7/1982 | Steiner et al. | 219/439 |
| 4,700,050 A | * | 10/1987 | Hennuy et al. | 219/438 |
| 4,731,522 A | * | 3/1988 | Manchester | 219/433 |
| 5,263,115 A | * | 11/1993 | Kauo et al. | 219/386 |
| 5,317,128 A | * | 5/1994 | Yao | 219/433 |
| 6,114,667 A | * | 9/2000 | Balandier et al. | 219/438 |
| 6,177,655 B1 | * | 1/2001 | Toman | 219/432 |
| 6,313,446 B1 | * | 11/2001 | Jones | 219/433 |
| 6,744,019 B2 | * | 6/2004 | Takegoshi | 219/433 |

FOREIGN PATENT DOCUMENTS

| | | | |
|---|---|---|---|
| DE | 3717845 A1 | * | 12/1987 |
| EP | 0317763 A2 | * | 5/1989 |

* cited by examiner

*Primary Examiner*—Joseph Pelham
(74) *Attorney, Agent, or Firm*—Troxell Law Office, PLLC

(57) ABSTRACT

The invention discloses a constant temperature sealed cooking device providing a conventional sealed cooker with constant temperature cooking effects. The constant temperature sealed cooking device is devised with a constant temperature generating apparatus at an inner lower portion of a heat resistant outer pot of the sealed cooking device. Using the constant temperature generating apparatus, a constant temperature within the inner pot is maintained to provide a desired cooked degree of food contained therein. Thus, the food prepared has tastes approaching those of food cooked by a high-speed oxidized heat source as a primary object of the invention.

3 Claims, 4 Drawing Sheets

| Time (hour) | Temperature (°C) | PTC Power (W) |
|---|---|---|
| 0 | 38 | 27 |
| 0.5 | 41 | 25 |
| 1 | 44 | 24 |
| 1.5 | 46 | 24 |
| 2 | 49 | 22 |
| 2.5 | 52 | 21 |
| 3 | 54 | 20 |
| 3.5 | 56 | 20 |
| 4 | 58 | 19 |
| 4.5 | 60 | 18 |
| 5 | 62 | 17 |
| 5.5 | 63 | 17 |
| 6 | 65 | 16 |
| 6.5 | 66 | 16 |
| 7 | 68 | 15 |
| 7.5 | 69 | 15 |
| 8 | 69 | 14 |
| 8.5 | 70 | 14 |
| 9 | 71 | 14 |
| 9.5 | 72 | 13 |
| 10 | 72 | 13 |
| 10.5 | 73 | 13 |
| 11 | 74 | 12 |
| 11.5 | 74 | 12 |
| 12 | 75 | 12 |
| 22 | 79 | 10 |
| 22.5 | 79 | 10 |
| 23 | 79 | 10 |

Upper Curve – Temperature Change
Lower Curve – PTC Power Compensation Curve

CONSTANT TEMPERATURE SEALED COOKING DEVICE

BACKGROUND OF THE INVENTION (a) Field of the Invention

The invention relates to a constant temperature sealed cooking device, and more particularly, to a novel structure providing a conventional sealed cooking device with constant temperature effects. The constant temperature sealed cooker is devised with a constant temperature generating apparatus at an inner lower portion of a heat resistant outer pot thereof. Using the constant temperature generating apparatus, a constant temperature within an inner pot is maintained.

(b) Description of the Prior Art

According to a common sealed cooker, an inner pot is heated by fire and placed into an interior of a sealed cooker. Using thermal insulation properties of the sealed cooker, food contained therein is continuously heated and cooked by the heat produced, thereby accomplishing purposes of economizing gas or electric power. Positive cooking effects are thus obtained as the food needs to be cooked to a certain degree. As a forerunner of a sealed cooker, an electric cooker or a gentle fire that cooks food in a method of gradual stewing offers specific tastes to the food prepared. Furthermore, nutrients of the food being prepared by an 80-degree Celsius remain undamaged, and therefore development of sealed cookers has beneficial effects regarding to resources and cuisine. However, conventional sealed cookers are prone to temperature lowering, and hence cooked degrees of food vary due to insufficient temperature. Food like meat requires a temperature over 80-degrees Celsius and rather lengthy sealed heating in order to be completely and thoroughly cooked. Also, for that sizes of individual pieces of meat may be different, time needed for sealed heating may be unequal too. Again, according to different sizes of the meat, it is likely that center portions of particular pieces are not entirely cooked when using a conventional sealed cooker because a temperature needed for thoroughly cooking the center portion is around 80 degrees Celsius, thereby creating different tastes relative to individual pieces of the meat. Amounts of heat accepted by various foods with different textures differ as well. For example, fats, proteins, fibers and vegetables, all need different amounts of heat to be completely cooked. Based on distinct heat resistance of various kinds of food, textures of food may be destructed for those that are non-endurable to continuous heating. In Chinese cuisine, because different kinds of food are cooked in a same pot, cooked degrees of the foods are consequently different as well. Therefore, for a dish well prepared in a same pot, it is essential to place different food according to appropriate orders. For example, meat that needs to be cooked with a longer period is simmered first, whereas food like vegetables or proteins that are easily cooked is placed into the pot in subsequent complementary steps. Yet, for a conventional sealed cooker in order to complete the subsequent complementary steps, a lid thereof is necessarily opened. As a result, heat therein is substantially dissipated to lower a cooked degree of the meat, and thereby failing to satisfy ideal cuisine. Thus, applications of conventional sealed cookers cannot be extensively adopted for all kinds of dishes.

Referring to FIG. 1 showing a temperature lowering curve of a conventional sealed cooker, when food is placed in the sealed pot after an inner pot thereof has reached a boiling point, only a temperature of approximately 95 degrees Celsius is remained, and the temperature further drops to 70 degrees Celsius at the $7^{th}$ hour. The curve drops direct proportionally, meaning that a temperature valid for cooking the meat only lasts for about three and half hours. In addition, for that pieces of meat come in various sizes, not all center portions of all pieces of meat can be thoroughly cooked within three and half hours. After three and half hours, the temperature is dropped to below 80 degrees Celsius. It then becomes probable that the pieces of meat are not completely cooked and may be unevenly cooked as well. For ribs stewed in sauces, a temperature below 80 degrees Celsius is hardly able to bring out nutrients in the marrow of bones, and a broth made may not have a deserved taste.

SUMMARY OF THE INVENTION

The primary object of the invention is to provide a constant temperature cooking device, which is capable of controlling and maintaining a constant temperature at an initial stage of sealed simmering, thereby preventing temperature lowering caused by subsequently adding complementary food to food previously placed therein. To be more precise, for cooking meat, constant temperature effects are utilized for continuous heating and then thoroughly cooking the meat. Subsequent food may be placed therein after having halted the constant temperature effects in order to lower the temperature. Residual heat after the temperature lowering is still sufficient for completely cooking the meat. Owing to preservation of the temperature, time needed for cooking is also reduced, thereby elevating applicability of the sealed cooker and expanding utilization of cooking numerous types of food in a same pot.

DETAILED DESCRIPTION OF THE PREFERRED EMBODIMENTS

A temperature constant sealed cooking device according to the invention utilizes a constant temperature apparatus provided therein, so as to obtain distinguishing multi-functional sealed cooking effects.

Figure 1:
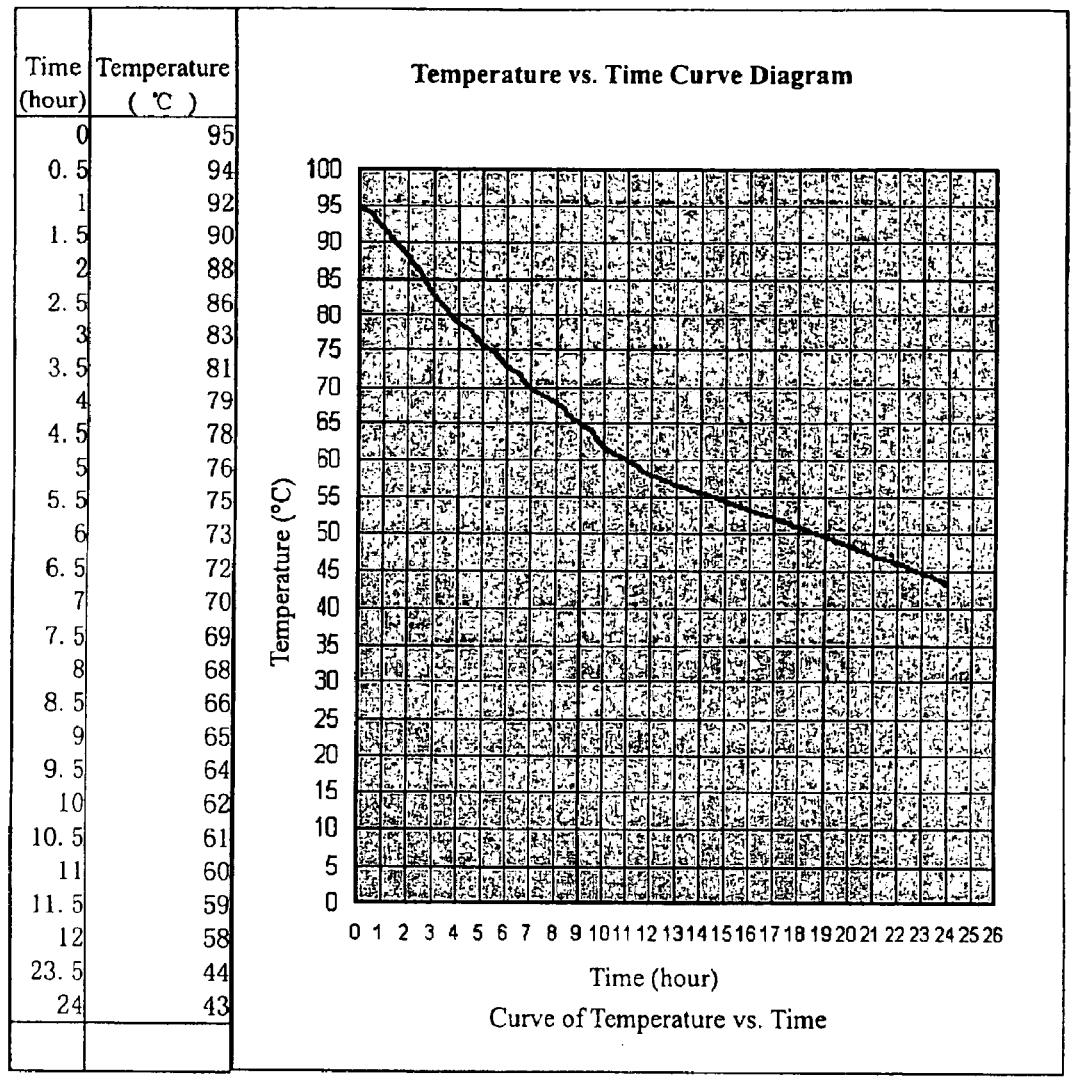
FIG. 1 shows a curve diagram illustrating a temperature drop of a conventional sealed cooker.
Figure 2:
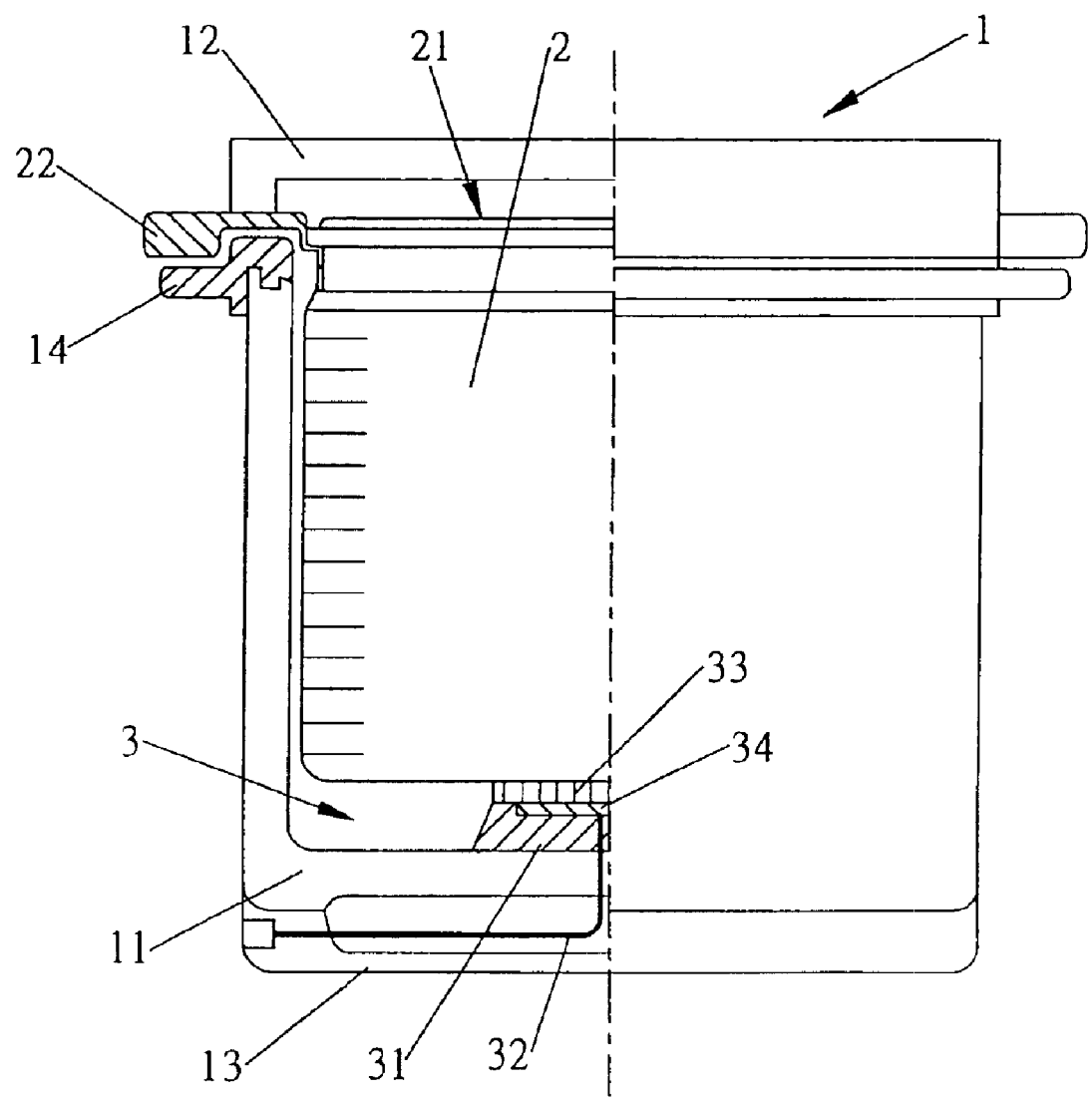
FIG. 2 shows a schematic view of an embodiment according to the invention.

To better understand the invention, detailed descriptions shall be given with the accompanying drawings below. Referring to FIG. 2, a sealed cooking device 1 according to the invention is similarly provided with a heat resistant outer pot 11 placed with an inner pot 2 at an interior thereof. The heat resistant outer pot 11 is provided with a lower tray 13 at a bottom portion thereof, and is sealed with a heat resistant upper cover 12 at a top portion thereof. The inner pot 2 is placed across a handle 22 to locate above an opening enclosing body 14, such that the inner pot 2 is suspended at the interior of the heat resistant outer pot 11. According to the invention, a temperature constant apparatus 3 is provided at an inner lower portion of the heat resistant outer pot 11, and is supported by a seat 31. The seat 31 has a heating element 34 made of a positive temperature constant ceramic resistor facing upward. The heating element 34 produces heat via electric conductance using a wire 32, and releases the heat produced via a heat conducting plate 33. The heat conducting plate 33 transmits thermal energy to an interior of the inner, pot 2, or are omni-directionally emitted with the interior of the inner pot 2, such that a constant heated temperature is filled withing an interior of the heat resistant outer pot 11. Similarly, a heated temperature may also be guided into the inner pot 2 from a periphery thereof.

The inner pot 2 is additionally provided and covered with an inner pot lid 21 so as to prevent steams from substantially discharging to an exterior.

Apart from an inner lower center portion of the heat resistant outer pot 11, as long as an operation condition of a heated temperature produced by the heating element 34 can be absorbed by the inner pot 2, the temperature constant apparatus 3 may also be provided at a periphery.

In addition to locating closely to each other for conducting heat, the heat conducting plate 33 and the inner pot 2 may also be located with an interval in between. A height of the inner pot 2 is adjusted relative to an upper portion of the opening enclosing body 14 using the handle 22, so that a lower surface of the inner pot 2 is adhered to and located with an interval from an upper surface of the heat conducting plate 33.

Figure 3:
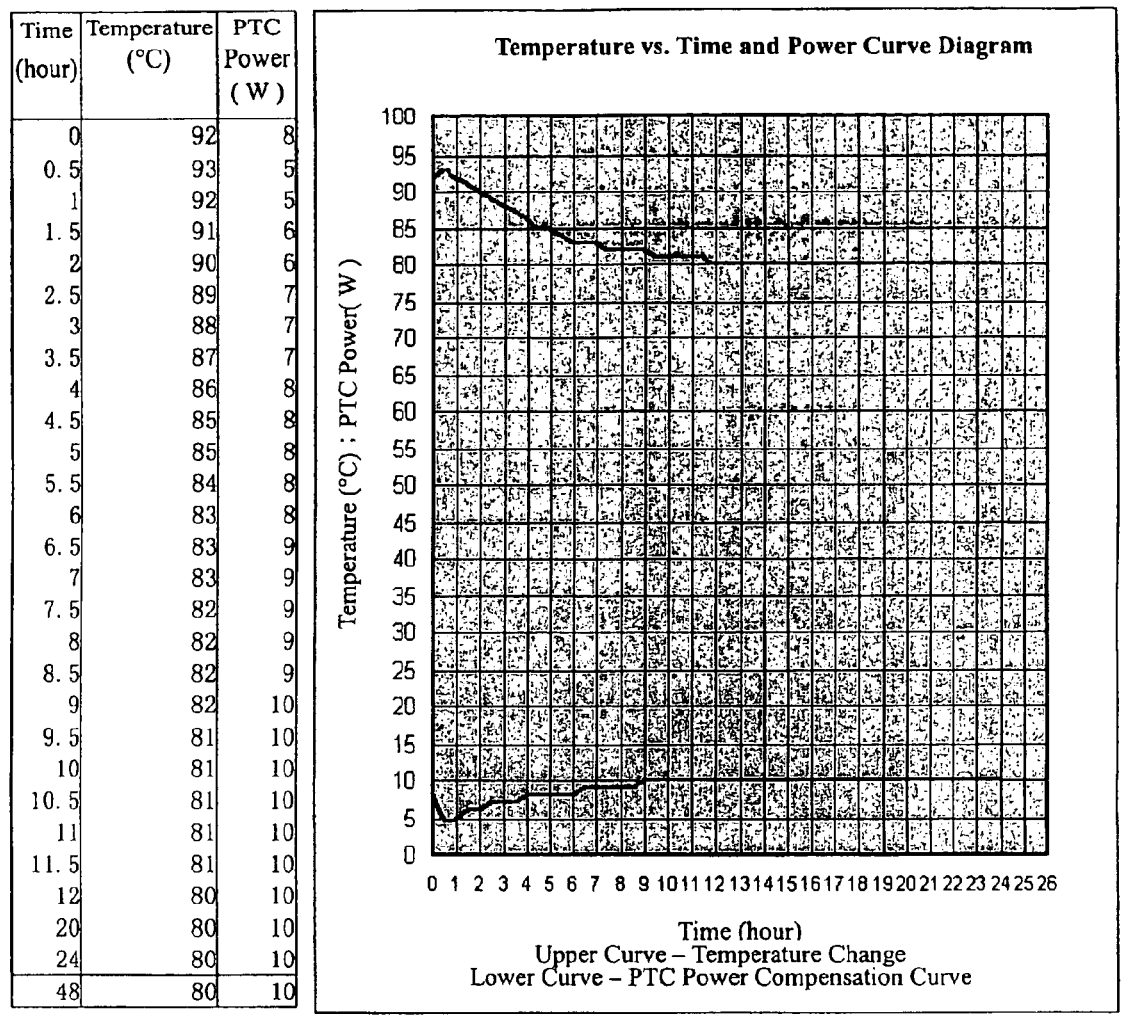
FIG. 3 shows a curve diagram of temperature and power versus time according to a conventional sealed cooking method.

With reference to FIG. 3 showing an embodiment according to the invention, when the inner pot is heated using an externally applied fire for producing constant temperature effects, it is placed in the heat resistant outer pot 11 at around 93 degrees Celsius. Within a half hour, for that the constant temperature apparatus 3 produces heat, a rise in temperature is resulted. Between the $9^{th}$ and $13^{th}$ hours, a constant temperature of 80 degrees Celsius is maintained.

Figure 4:
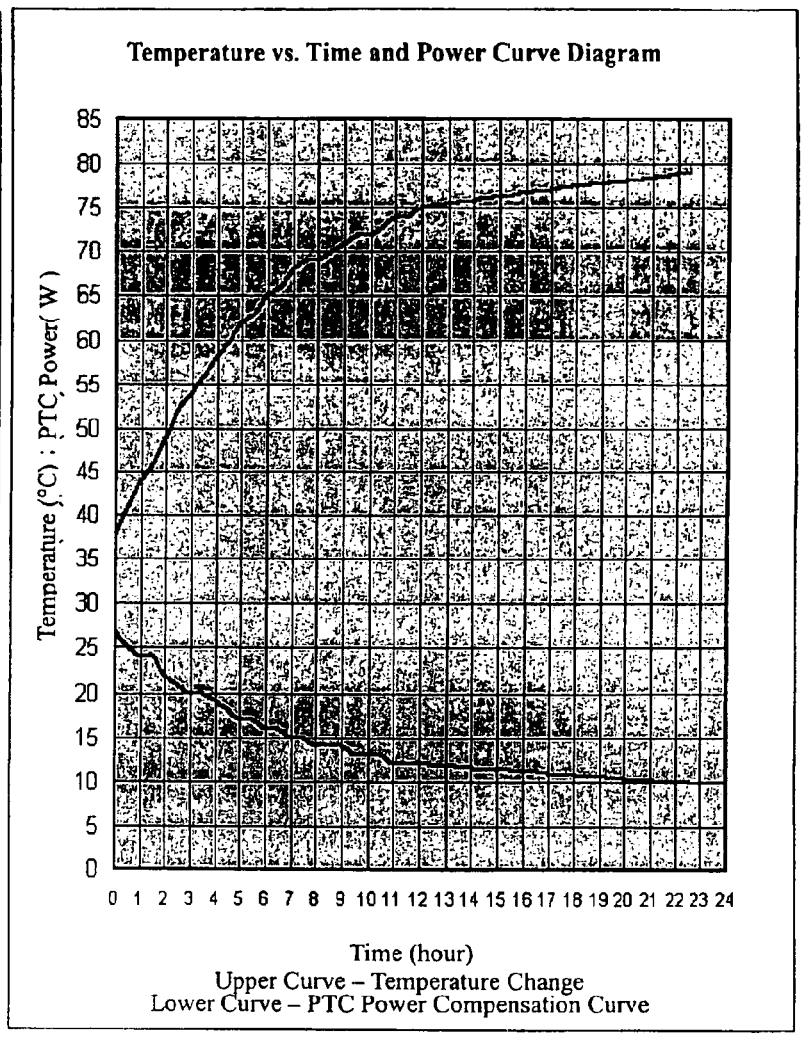
FIG. 4 shows a curve diagram of temperature and power versus time in an embodiment according to the invention.

Referring to FIG. 4, according to application of the invention, without requiring preheating with an additional fire, a dish in room temperature can be directly placed into an interior of the pot. With conductance of electric power using the wire 32, a heated temperature is produced by the constant temperature apparatus 3. At a beginning of heating, power required is around 27 W from a power curve. After 12 hours, a temperature of 25 degrees Celsius is obtained based on the temperature curve. Heating is continued to $22^{nd}$ hour using a low power consumption, and a temperature on the temperature curve then approaches 80 degrees Celsius. Using the aforesaid sealed simmering method, food prepared is extremely unique. For instance, meats prepared with such method have textures that melt smoothly in one's mouth; or, seafood prepared with such method is preserved with its original delicacy.

It is apparent from the aforesaid applications that, the invention not only solves shortcomings as uneven cooked degrees of foods caused by temperature lowering of conventional sealed cookers, but also has positive effects over temperature lowering due to cooking orders or opening a pot cover while cooking as well as maintaining original tastes and freshness of food. In addition, power required is rather low, and can be adjusted based on an actual operation volume. Therefore, the invention is distinct from cooking methods of conventional electric cookers or sealed cookers.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A constant temperature cooking device comprising:
   a) a heat resistant outer pot having:
      i) a heat resistant upper cover sealing a top thereof; and
      ii) an opening enclosing body;
   b) an inner pot located in an interior of the heat resistant outer pot having:
      i) an inner pot lid sealing a top thereof; and
      ii) a handle located above the opening enclosing body and suspending the inner pot within the interior of the heat resistant outer pot; and
   c) a heating apparatus located on an interior of the bottom of the heat resistant outer pot and having a heating element that is a positive temperature ceramic resister and a heat conducting plate located above the positive temperature ceramic resister.

2. The constant temperature cooking device according to claim 1, wherein the heat resistant outer pot has a lower tray located below the bottom thereof.

3. The constant temperature cooking device according to claim 1, wherein the heating apparatus is spaced apart from the inner pot.

* * * * *